123,743

UNITED STATES PATENT OFFICE.

BENJAMIN TANNER, OF NEW BRIGHTON, ENGLAND.

IMPROVEMENT IN THE MANUFACTURE OF PHOSPHATES OF THE ALKALIES.

Specification forming part of Letters Patent No. 123,743, dated February 13, 1872.

I, BENJAMIN TANNER, of New Brighton, in the county of Chester, England, have invented certain "Improvements in the Manufacture of Phosphates of Soda and other Alkaline Bases," of which the following is a specification:

It is a well-known fact, which has been described in standard chemical works published many years since, that acid phosphate of soda may be produced in the following manner: "One atom of phosphoric acid heated with common salt unites with only one atom of soda, and, with two atoms of basic water, forms this salt," namely, acid or monophosphate of soda. From the acid phosphate of soda the other forms of phosphate of soda are obtained by various well-known processes. I have discovered that by the use of the improved processes of manufacture hereinafter described I am able to produce acid phosphate of soda and other forms of phosphate of soda much more efficiently and economically than by any of the processes heretofore known or in use. The employment of chloride of sodium or common salt has been hitherto attended with difficulties, owing to the fact that the temperature which was considered necessary to decompose more than one equivalent of chloride of sodium displaced the basic water, thereby forming pyrophosphate of soda, or mixtures of metaphosphate and pyrophosphate of soda. This necessitated the use by the operator who desired to produce other forms of phosphate of soda of the more expensive sources of soda in the form of caustic soda, or carbonate of soda, or sulphate of soda. By the present invention I am enabled to obviate the difficulties above mentioned by submitting, in the manner hereinafter described, the materials which are employed to the action of steam, superheated steam, or mixtures of steam and hot air, or mixtures thereof, with or without the assistance of heat applied to the bottom of the furnace in which the operation is carried on, whereby the decomposition is accomplished more perfectly and with greater facility, less expensive materials being available for the manufacture, and the difficulty hereinbefore referred to is conveniently overcome. It will be seen that the materials operated upon are those which have been, as is well known, previously used; but the mode of operating upon them, and, in particular, the use of the steam, superheated steam, and hot air, hereinafter described, will, as I have discovered, produce far more beneficial results than could have been obtained by any other process previously discovered with which I have hitherto been acquainted.

For the convenience of reference, the several portions of this specification will be consecutively numbered.

First. For the production of monosodic phosphate (having a composition of one equivalent of soda, two equivalents of basic water, and one equivalent of phosphoric acid, with or without water of crystallization) phosphoric acid is mixed with chloride of sodium in such proportions that one equivalent of phosphoric acid shall react upon one equivalent of chloride of sodium, and for this purpose it is preferred to use seventy-one hundred weights of phosphoric acid with about fifty-eight and a half hundred weights of chloride of sodium. These materials may be used in a more or less pure condition. In practice, they may be mixed in the proportion of three hundred and fifty-five hundred weights of commercial phosphoric acid, containing twenty per cent. of phosphoric acid, and about sixty-five hundred weights of common salt, containing ninety per cent. of chloride of sodium. This operation may be performed in any convenient vessel in which the temperature can be easily raised; but furnaces made of fire-clay, or constructed in a similar manner to those employed in the manufacture of soda-ash, are preferred for this purpose. In order to effect the evaporation of the mixture, I employ currents of steam, or mixtures of steam and hot air, or superheated steam, or mixtures thereof. These currents are made to pass over into or through the mixture or mixtures acted upon, either with or without the employment of additional heat applied to the bottom of the furnace in which the operation is performed, and the heat is continued to be applied until acid fumes cease to be thrown off. When superheated steam is used to effect the required decomposition, the temperature of the steam may safely be raised to 350° or 400° Fahrenheit, and in some cases the temperature may be increased to 450° Fahrenheit without injury to the product obtained. When mixtures of hot air and steam are employed for this purpose, the requisite temperature is regulated according to the proportion in which the steam and hot air are mixed; thus the temperature of the mixture of hot air and steam should be lowered from that above named down to about from 220° to 250° Fahrenheit as the proportion of steam in the mixture is decreased. The above-named materials may be mixed in a reverberatory furnace and treated in the same way as that by which sulphate of soda is commonly made, simply substituting phosphoric acid in the proper proportion (which would be well known) for the sulphuric acid employed in such manufacture, and in making use of the ground heat supplied (which it is preferred should not rise beyond 280° Fahrenheit) in conjunction with mixtures of steam and hot air, or superheated steam, or steam, or mixtures thereof. The temperature should be controlled within the desired limits, as already described. I have found that the use of either superheated steam, or mixtures of hot air and steam, or steam, or mixtures thereof, by passing the same into, over, or through the material, as above described, very much assists the liberation of the acid fumes, (which is usually continued till they cease to be evolved,) and tends to make the decomposition comparatively more rapid and perfect. The fumes thrown off are condensed or utilized by well-known processes, and which form no part of my said invention. The monosodic phosphate produced by either of the foregoing processes is sometimes dissolved by means of water, and may be evaporated or crystallized by any of the methods now employed for such purpose, or purified by other convenient and usual arrangements.

Second. When it is desired to produce bisodic phosphate, (having a composition of two equivalents of soda, one equivalent of basic water, and one equivalent of phosphoric acid, with or without water of crystallization,) the only variation from the processes described in the paragraph hereof numbered 1 which is necessary is an increase in the quantity of chloride of sodium, which, for this purpose, should be added in double the proportion named therein—that is to say, for three hundred and fifty-five hundred weights of commercial phosphoric acid, containing twenty per cent. of phosphoric acid, about one hundred and thirty hundred weights of common salt, containing ninety per cent. of chloride of sodium, would be required. The higher temperature—by the use of steam, or superheated steam, or mixtures of hot air and steam, or mixtures thereof, as described in paragraph hereof numbered 1—is preferred, and when necessary the bisodic phosphate is purified, as hereinbefore described.

Third. When trisodic phosphate (having a composition of three equivalents of soda and one of phosphoric acid, with or without water of crystallization) is required, either of the processes described in the paragraph hereof numbered 1 is adopted, (using, by preference, the higher temperature hereinbefore described,) with an increase in the quantity of common salt, which should be, as nearly as is practicable, three times the quantity named in the last-mentioned paragraph—that is to say, for three hundred and fifty-five hundred weights of commercial phosphoric acid, containing twenty per cent. of phosphoric acid, about one hundred and ninety-five hundred weights of common salt, containing ninety per cent. of chloride of sodium, would be necessary. In some cases, at the stage of the process when acid fumes cease to come off, the product may be subjected to heat gradually increased to a red heat, with or without the continued application of steam, or superheated steam, or mixtures of hot air and steam, or mixtures thereof, in the manner already described, so as to displace any chlorine remaining. The trisodic phosphate obtained by either of the foregoing processes may be purified by the methods of purification ordinarily used, as hereinbefore described. When the phosphoric acid employed in either of the foregoing processes contains any acid capable of decomposing chloride of sodium, (such as sulphuric acid,) either as an impurity or admixture, a larger quantity of chloride of sodium will be required. If the phosphoric acid contained ten per cent. anhydrous sulphuric acid, either as an impurity or admixture, then ten tons of such acid would contain one ton anhydrous sulphuric acid, and would require about thirty-three hundred weights of commercial chloride of sodium of ninety per cent. purity in addition to the quantity required for the phosphoric acid. The sulphate of soda so formed may either be allowed to remain in the product, or be separated by crystallization or by any convenient arrangement.

Fourth. The proportions in which the materials are mixed should, as is well known, be regulated by their purity and strength, and by the condition or form in which it is desired to obtain either of the phosphates of soda; but for economical working it is preferred to use the phosphoric acid in the proportion of one equivalent of phosphoric acid to one, two, or three equivalents of soda, and, by increasing and continuing the temperature in the manner described, monosodic, bisodic, or trisodic phosphate can be efficiently and very economically produced. For the convenience of manufacture, it is preferred to add the required quantity of phosphoric acid and chloride of sodium by one and the same operation; but it is evident that the same end may be attained by successive additions at different stages of the operation, and, also, by regulating the proportion of chloride of sodium employed, mixtures of any of the foregoing phosphates can be obtained. By means of the foregoing treatment, and on the same principle, monosodic or bisodic phosphate, or metaphosphate, or pyrophosphate of soda, or mixtures thereof, can be made to react on chloride of sodium for the production of any of the before-named phosphates of soda by regulating the proportion of the mixture according to the product desired. In some cases it is found advantageous to intermix with the mass, either before or after evaporation, coke or pumice-stone, or some similar material, preferably in small lumps, and then proceed in the manner already described. When the decomposition is completed, the mass may be lixiviated by any suitable arrangement, and the phosphate of soda obtained in the manner described in the paragraph hereof numbered 1. The coke or pumice-stone, or other materials, can be again employed for a similar purpose, or the mixture may be reduced to powder without separation of the coke or pumice-stone. The coke or pumice-stone, or similar materials, so employed divides the mass, and keeps the mixture more open to the action of the steam, or superheated steam, or mixtures of steam and hot air, and thus facilitates the completion of the process.

Fifth. The processes of manufacture above described for producing phosphates of soda are employed in the production of phosphates of other alkaline bases (such as potash or ammonia) by the employment of the chloride of either of the other alkalies, these being treated in the same manner as has been herein described for chloride of sodium, and the proportions in which they are used being varied according to their respective equivalents or combining proportions, which are well known to chemists and recognized in manufacturing processes. In like manner, and on the same principle, phosphates having more than one alkaline base may be produced by using, in the manner herein described, a mixture of the said bases, or of the aforesaid compounds thereof, instead of using a single base or any of the before-mentioned compounds thereof.

It should be observed that the proportions of the substances employed for the purposes of my said invention are not in all cases precisely such as are hereinbefore mentioned, as such proportions may, as will be well known to persons experienced in the manufacture of analogous chemical products, in some instances, be varied without departing from the principles of my said invention.

Having thus described and ascertained the nature of my said invention, and in what manner the same is to be performed, I would observe, in conclusion, that what I consider novel and original, and therefore claim as constituting the invention intended to be secured to me, are—

1. The production of monosodic, bisodic, or trisodic phosphates, or mixtures thereof, by the aid of currents of steam, or superheated steam, or mixtures thereof with heated air, in the manner hereinbefore substantially described and set forth;

2. The production of the corresponding salts of potash or ammonia by the aid of currents of steam, or superheated steam, or mixtures thereof with heated air, in the manner hereinbefore substantially described and set forth; and 3. The production of tribasic phosphates having more than one of the before-mentioned alkalies (namely, soda, potash, or ammonia) as bases thereof, by the aid of currents of steam, or superheated steam, or mixtures thereof with heated air, in the manner hereinbefore substantially described and set forth.

BENJAMIN TANNER.

Witnesses:
  WILLIAM J. ROBINSON,
    *Not. Pub., Liverpool.*
  JOHN LOCKHART,
    *Clerk with Messrs. Anderson, Collins & Robinson, Solicitors, Liverpool.*